(12) United States Patent
Furuta et al.

(10) Patent No.: US 9,432,547 B2
(45) Date of Patent: Aug. 30, 2016

(54) IMAGE FORMING APPARATUS AND DENSITY CORRECTION METHOD

(71) Applicant: Konica Minolta, Inc., Tokyo (JP)

(72) Inventors: Tatsuya Furuta, Tokyo (JP); Shota Sakurai, Tokyo (JP); Kazuhiro Saito, Tokyo (JP); Tomohiro Kawasaki, Kanagawa (JP); Kazuteru Ishizuka, Saitama (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/950,501

(22) Filed: Nov. 24, 2015

(65) Prior Publication Data

US 2016/0150117 A1    May 26, 2016

(30) Foreign Application Priority Data

Nov. 26, 2014 (JP) ................................. 2014-238720

(51) Int. Cl.
*G03G 15/00* (2006.01)
*H04N 1/04* (2006.01)
*H04N 1/00* (2006.01)
*G06K 15/14* (2006.01)

(52) U.S. Cl.
CPC ........ *H04N 1/0414* (2013.01); *G03G 15/5025* (2013.01); *G06K 15/14* (2013.01); *H04N 1/0032* (2013.01); *G03G 2215/00455* (2013.01); *G03G 2215/047* (2013.01); *G03G 2215/048* (2013.01); *G03G 2215/0429* (2013.01); *G03G 2215/0468* (2013.01); *G03G 2215/0478* (2013.01)

(58) Field of Classification Search
CPC .......... G03G 2215/00455; G03G 2215/0429; G03G 2215/0468; G03G 2215/047; G03G 2215/0478; G03G 2215/048
USPC ......................... 101/138, 176, 178, 196, 219
See application file for complete search history.

(56) References Cited

U.S. PATENT DOCUMENTS

| 8,849,132 B2 * | 9/2014 | Henderson ......... G03G 15/0178 399/38 |
| 2015/0362879 A1 * | 12/2015 | Kaneko ................ G03G 15/556 399/49 |

FOREIGN PATENT DOCUMENTS

| JP | 2013195586 A | 9/2013 |
| JP | 2014116711 A | 6/2014 |

\* cited by examiner

*Primary Examiner* — David Gray
*Assistant Examiner* — Tyler Hardman
(74) *Attorney, Agent, or Firm* — Lucas & Mercanti, LLP (57) ABSTRACT

An image forming apparatus includes: an image forming section including a rotational member and configured to form an image on the long sheet; a density unevenness cycle acquiring section configured to acquire a cycle of a density profile that represents density variation in a sub scanning direction; a cycle control section configured to operate such that, in a case where a same image is continuously formed on the long sheet, a length of the image in the sub scanning direction is an integer multiple of a cycle length that corresponds to one cycle of the density profile; and a density correction section configured to form a patch image for correction that has a size greater than the cycle length of the density profile on the image bearing member, and perform density correction using correction data created based on a detection result regarding the patch image for correction.

20 Claims, 7 Drawing Sheets

IMAGE FORMING APPARATUS AND DENSITY CORRECTION METHOD

CROSS REFERENCE TO RELATED APPLICATIONS

This application is entitled to and claims the benefit of Japanese Patent Application No. 2014-238720, filed on Nov. 26, 2014, the disclosure of which including the specification, drawings and abstract is incorporated herein by reference in its entirety.

BACKGROUND OF THE INVENTION

1. Field of the Invention

The present invention relates to an electrophotographic image forming apparatus capable of forming an image on a long sheet and a density correction method used in the image forming apparatus.

2. Description of Related Art

In general, an electrophotographic image forming apparatus (such as a printer, a copy machine, and a fax machine) is configured to irradiate (expose) a uniformly-charged photoconductor (for example, a photoconductor drum) with (to) light based on image data to form an electrostatic latent image on the surface of the photoconductor. The electrostatic latent image is then visualized by supplying toner from a developing device to the photoconductor on which the electrostatic latent image is formed, whereby a toner image is formed. Further, the toner image is directly or indirectly transferred to a sheet through an intermediate transfer belt, followed by heating and pressurization for fixing at a fixing section, whereby an image is formed on the sheet.

An image forming apparatus includes various rotational members such as a photoconductor and a developer bearing member, and is known to cause cyclic density unevenness in the sub scanning direction on an image due to rotational runout of the rotational members. For example, the interval (development gap) between the photoconductor and the developer bearing member is cyclically changed due to rotational runout of the photoconductor or the developer bearing member, and thus the electric field intensity is cyclically changed even when a constant developing bias is applied. As a result, on the image, density unevenness is caused in a cycle same as the rotation cycle of the photoconductor or the developer bearing member.

In a conventional image forming apparatus, correction data corresponding to a rotation position (phase relative to a home position) of a photoconductor is created based on a density profile representing density variation in the sub scanning direction such that the cyclic density unevenness is offset, for example. The correction data is used to correct image formation conditions such as the light exposure energy (light exposure time or light exposure output), the charging voltage, the developing bias voltage, and the rotational frequency of the developer bearing member (for example, developing roller), and the density value (gradation value) of input image data (for example, Japanese Patent Application Laid-Open Nos. 2014-116711 and 2013-195586).

Figure 1:
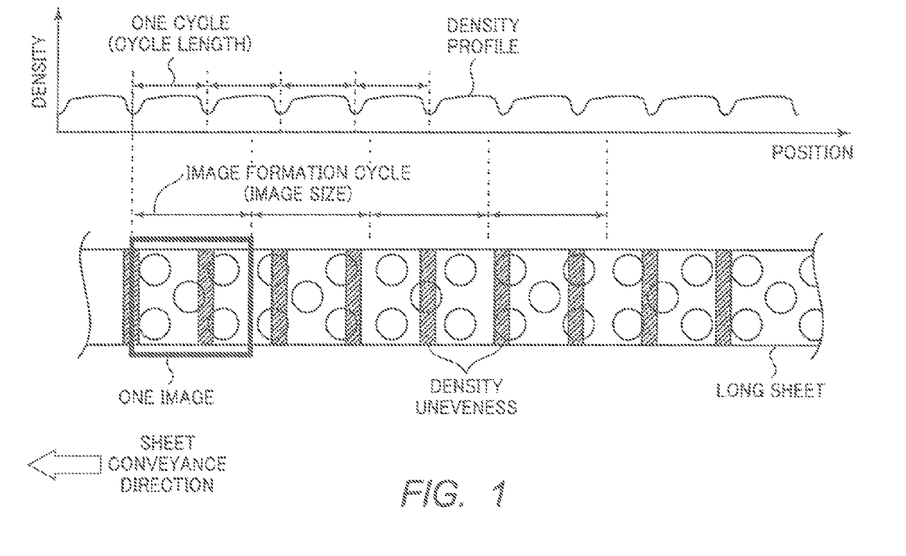
FIG. 1 illustrates a relationship between a density profile and density unevenness on an image when an image is continuously formed on a long sheet in a conventional image forming apparatus.

FIG. 1 illustrates a relationship between a density profile and density unevenness on an image when an image is continuously formed on a long sheet. As illustrated in FIG. 1, in the case of an image in which multiple label images are provided in a spaced relationship in a predetermined pattern, the smallest repeating pattern (in FIG. 1, a pattern having five label images) is referred to as an image.

Typically, when an image is continuously formed on a long sheet as illustrated in FIG. 1, the cycle of the density profile and the cycle of image formation differ from each other. That is, the relationship between the density profile and the image is different among the images. Consequently, the correction data used for density correction differs among the images.

In the case where images are formed on flat sheets, a patch image elongated in the sub scanning direction is formed by utilizing the intervals between sheets and the density of the patch image is detected, to periodically acquire the density profile. Therefore, the density correction can be accurately performed by periodically acquiring the density profile. However, when an image is continuously formed on a long sheet, the interval between sheets cannot be ensured, and therefore the density profile cannot be periodically acquired. For this reason, correction data created based on the initial density profile is used to perform density correction; however, when the density profile changes with time, the difference in color appearance is increased among the images, and constant image quality among the images may not be maintained.

SUMMARY OF THE INVENTION

An object of the present invention is to provide an image forming apparatus and a density correction method which can efficiently correct cyclic density variation in the sub scanning direction and can maintain a constant image quality among images in the case where the same image is continuously formed on a long sheet.

To achieve at least one of the abovementioned objects, an image forming apparatus reflecting one aspect of the present invention includes: a sheet conveyance section capable of conveying a long sheet; an image forming section including a rotational member and configured to form an image on the long sheet, the rotational member including a photoconductor and a developer bearing member; a density unevenness cycle acquiring section configured to acquire a cycle of a density profile that represents density variation in a sub scanning direction; a cycle control section configured to operate such that, in a case where a same image is continuously formed on the long sheet, a length of the image in the sub scanning direction is an integer multiple of a cycle length that corresponds to one cycle of the density profile; an image density detection section configured to detect a density of an image formed by the image forming section on an image bearing member; and a density correction section configured to form a patch image for correction that has a size greater than the cycle length of the density profile on the image bearing member, and, based on a detection result regarding the patch image for correction that is obtained by the image density detection section, create correction data to perform density correction using the correction data.

To achieve at least one of the abovementioned objects, a density correction method reflecting one aspect of the present invention is intended to be used in an image forming apparatus including: a sheet conveyance section capable of conveying a long sheet, and an image forming section including a rotational member and configured to form an image on the long sheet, the rotational member including a photoconductor and a developer bearing member, and the method includes: acquiring a cycle of a density profile that represents density variation in a sub scanning direction; setting a length of the image in the sub scanning direction to an integer multiple of a cycle length that corresponds to one cycle of the density profile in a case where a same image is continuously formed on the long sheet; and forming a patch image for correction that has a size greater than the cycle length of the density profile on an image bearing member, and, based on a density of the patch image for correction, creating correction data to perform density correction using the correction data.

BRIEF DESCRIPTION OF DRAWINGS

The present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

In the following, embodiments of the present invention will be described in detail with reference to the accompanying drawings.

Figure 2:
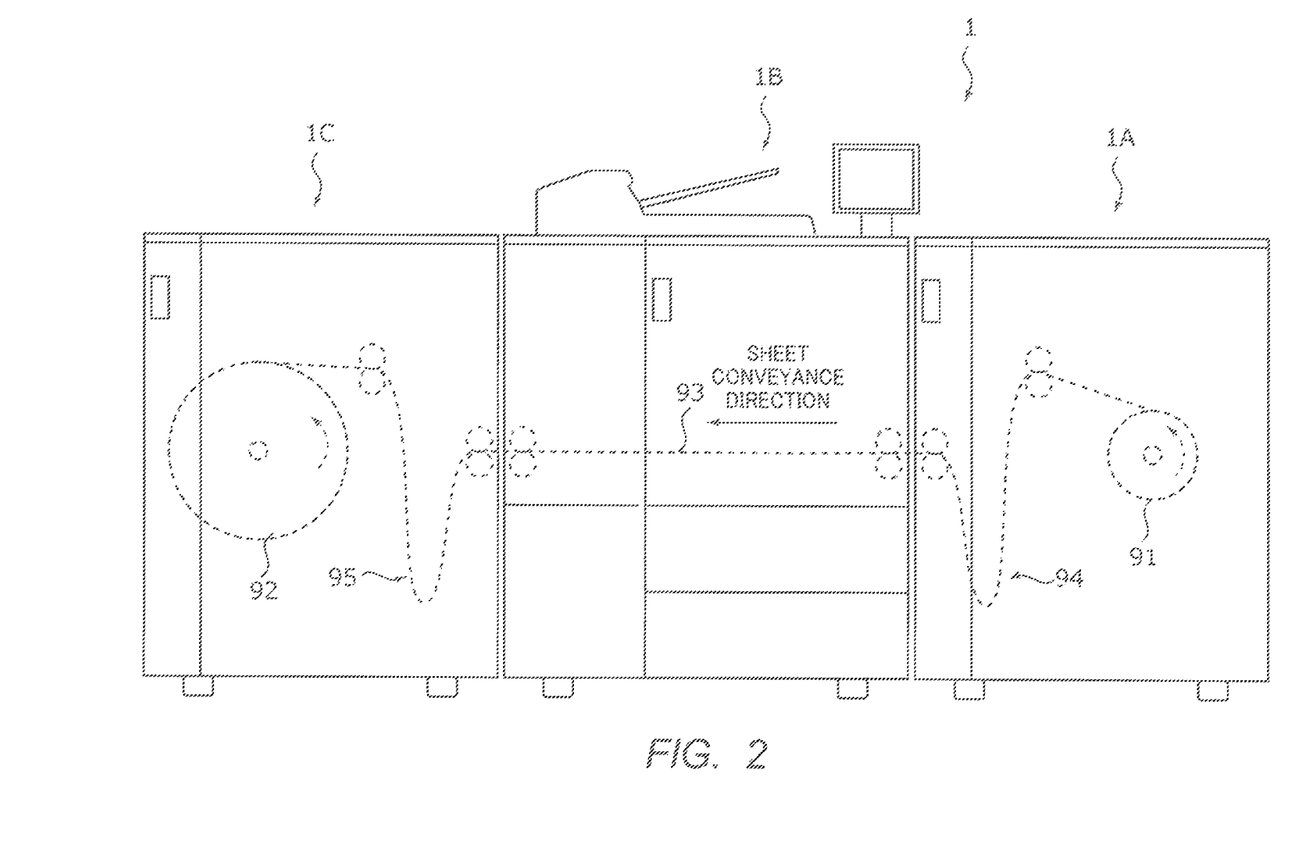
FIG. 2 illustrates an image forming apparatus according to an embodiment of the present invention.

FIG. 2 illustrates a configuration of image forming apparatus 1 according to the embodiment of the present invention.

Image forming apparatus 1 illustrated in FIG. 2 includes sheet feeding apparatus 1A, image forming apparatus main body 1B, and winding apparatus 1C. Image forming apparatus 1 forms an image on a roll sheet, and the present invention is suitable for a case where a long sheet such as a roll sheet and a continuous sheet, that is, a case where multiple images are continuously formed on a sheet having no sheet interval space.

Sheet feeding apparatus 1A includes roll sheet feeding section 91, sheet feeding side buffer section 94 and the like, and feeds a roll sheet under the instruction of image forming apparatus main body 1B. In sheet feeding side buffer section 94, for example, slackening of the roll sheet is absorbed with a vertically movable tension roller, an air blasting device that applies air to the roll sheet, a suction device that sucks the roll sheet or the like, and thus a proper tensile force is given to the roll sheet.

The roll sheet fed from sheet feeding apparatus 1A is conveyed along sheet feeding path 93. Image forming apparatus 1B forms an image on a roll sheet fed from sheet feeding apparatus 1A with use of an electrophotographic technique.

Winding apparatus 1C includes roll winding section 92 and winding side buffer section 95, and winds up a roll sheet on which an image has been formed by image forming apparatus main body 1B. Winding side buffer section 95 has a configuration similar to that of sheet feeding side buffer section 94.

Figure 3:
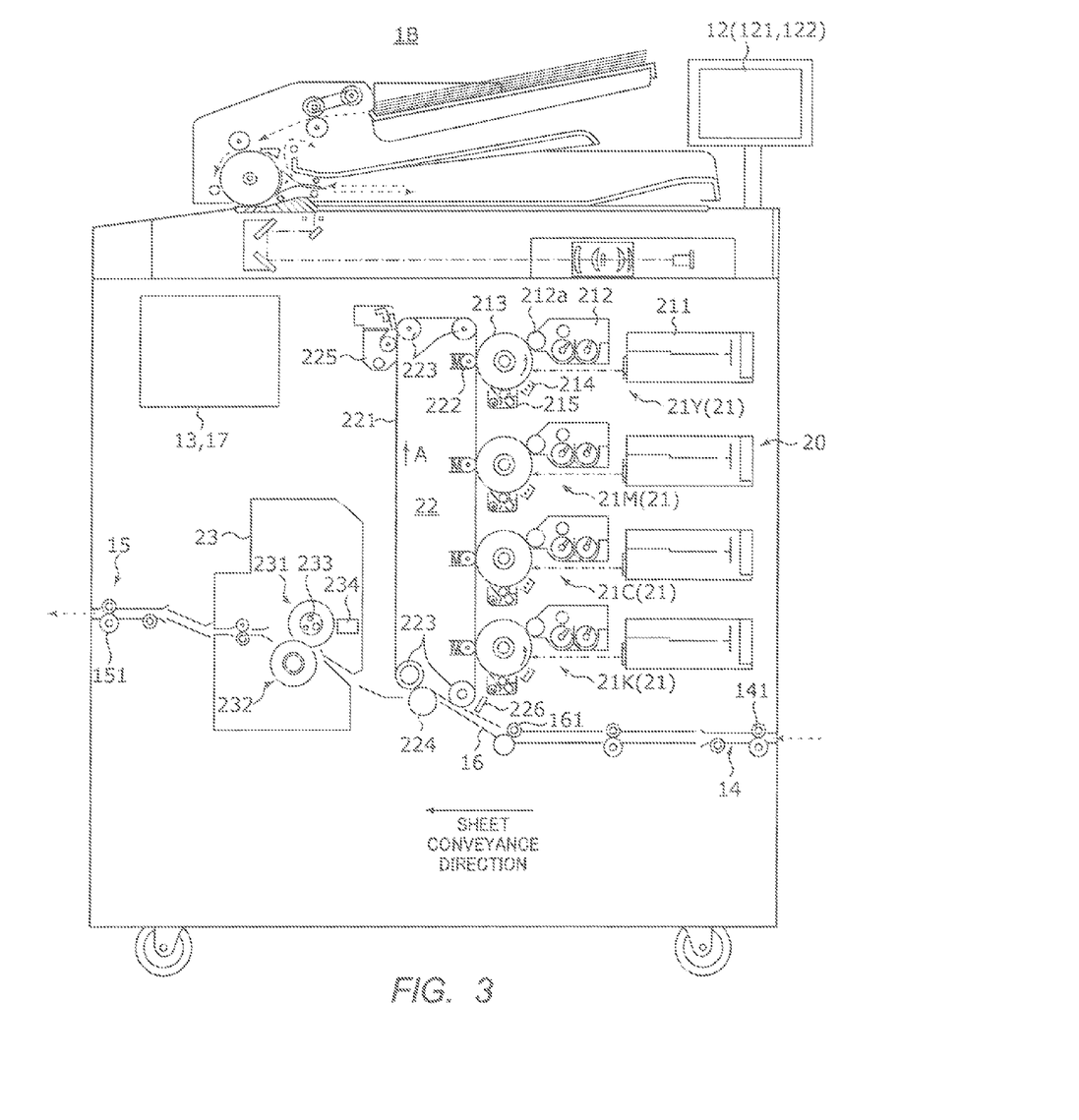
FIG. 3 illustrates a general configuration of the image forming apparatus main body.
Figure 4:
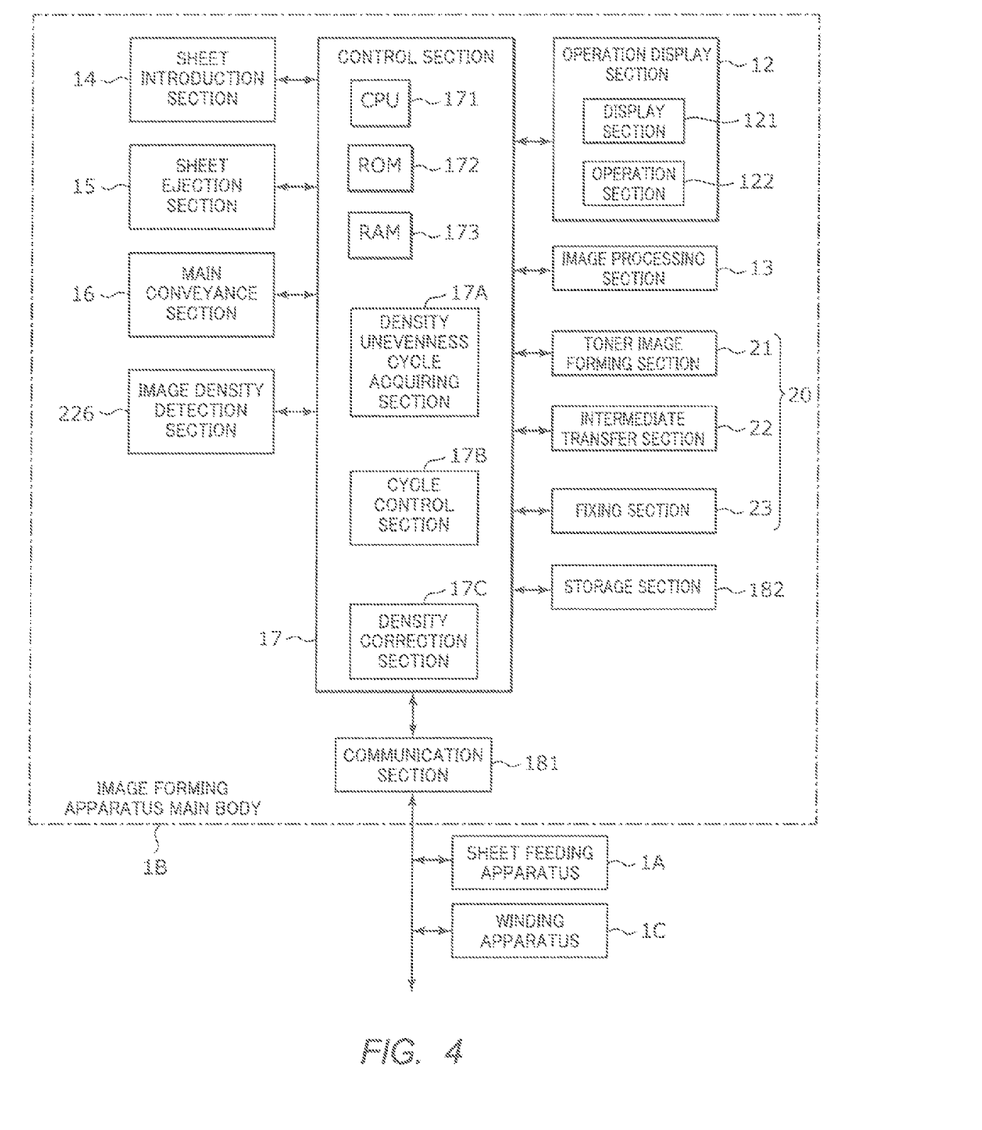
FIG. 4 illustrates a main part of a control system of the image forming apparatus main body.

FIG. 3 illustrates a general configuration of image forming apparatus main body 1B. FIG. 4 illustrates a main part of a control system of image forming apparatus main body 1B.

Image forming apparatus main body 1B illustrated in FIGS. 3 and 4 is a color image forming apparatus of an intermediate transfer system using electrophotographic process technology. A longitudinal tandem system is adopted for image forming apparatus main body 1B. In the longitudinal tandem system, respective photoconductor drums 213 corresponding to the four colors of YMCK are placed in series in the travelling direction (vertical direction) of intermediate transfer belt 221, and the toner images of the four colors are sequentially transferred to intermediate transfer belt 221 in one cycle.

That is, image forming apparatus main body 1B transfers (primary-transfers) toner images of yellow (Y), magenta (M), cyan (C), and black (K) formed on photoconductor drums 213 to intermediate transfer belt 221, and superimposes the toner images of the four colors on one another on intermediate transfer belt 221. Then, image forming apparatus main body 1B transfers (secondary-transfers) the resultant image to a sheet, to thereby form an image.

As illustrated in FIGS. 3 and 4, image forming apparatus main body 1B includes operation display section 12, image processing section 13, image forming section 20, sheet introduction section 14, sheet ejection section 15, main conveyance section 16, and control section 17.

Control section 17 includes central processing unit (CPU) 171, read only memory (ROM) 172, random access memory (RAM) 173 and the like. CPU 171 reads a program suited to processing contents out of ROM 172 or storage section 182, develops the program in RAM 173, and integrally controls the operation of each block of image forming apparatus 1B, sheet feeding apparatus 1A and winding apparatus 1C in cooperation with the developed program.

Communication section 181 has various interfaces such as network interface card (NIC), modulator-demodulator (MODEM), and universal serial bus (USB), for example, and provides a function of communication with sheet feeding apparatus 1A, winding apparatus 1C, or other external apparatuses.

Storage section 182 is composed of, for example, a non-volatile semiconductor memory (so-called flash memory) or a hard disk drive. Storage section 182 stores therein a look-up table which is referenced when the operation of each block is controlled, for example. In addition, a rotation cycle (a circumference corresponding to the length of one cycle) of photoconductor drum 213 and developer bearing member 212a (for example, a developing roller) is registered in advance in storage section 182.

Control section 17 transmits and receives various data to and from an external apparatus (for example, a personal computer) connected to a communication network such as a local area network (LAN) or a wide area network (WAN), through communication section 181. Control section 17 receives image data (input image data) of page description language (PDL) that has been sent from an external device, and controls the apparatus to form an image on a sheet on the basis of the data, for example. In addition, control section 17 functions as density unevenness cycle acquiring section 17A, cycle control section 17B, and density correction section 17C. These functions will be described later.

Operation display section 12 includes, for example, a liquid crystal display (LCD) with a touch panel, and functions as display section 121 and operation section 122. Display section 121 displays various operation screens, image conditions, operating statuses of functions, and the like in accordance with display control signals received from control section 17. Operation section 122 includes various operation keys such as numeric keys and a start key, receives various input operations performed by a user, and outputs operation signals to control section 17. By operating operation display section 12, the user can perform setting relating to the image formation such as document setting, image quality setting, multiplying factor setting, application setting, output setting, and sheet setting.

Image processing section 13 includes a circuit that performs a digital image process suited to initial settings or user settings on the input image data, and the like. For example, image processing section 13 performs tone correction on the basis of tone correction data under the control of control section 17. Image processing section 13 also performs various correction processes such as color correction and shading correction on the input image data. Image forming section 20 is controlled on the basis of the image data that has been subjected to these processes.

Image forming section 20 includes: toner image forming section 21 configured to form toner images of colored toners respectively containing a Y component, an M component, a C component, and a K component on the basis of the input image data; intermediate transfer section 22 configured to transfer a toner image formed by toner image forming sections 21 to a sheet; fixing section 23 configured to fix a transferred toner image to a sheet; and the like.

Toner image forming section 21 includes four toner image forming sections 21Y, 21M, 21C, and 21K for the Y component, the M component, the C component, and the K component, respectively. Since toner image forming sections 21Y, 21M, 21C, and 21K have similar configurations, common elements are denoted by the same reference signs for ease of illustration and description. Only when elements need to be discriminated from one another, Y, M, C, K is added to their reference signs. In FIG. 2, reference signs are given to only the elements of toner image forming section 21Y for the Y component, and reference signs are omitted for the elements of other toner image forming sections 41M, 21C, and 21K.

Toner image forming section 21 includes exposing device 211, developing device 212, photoconductor drum 213, charging device 214, drum cleaning device 215 and the like. Toner image forming section 21 may include a discharging device for removing the residual electric charge remaining on the surface of photoconductor drum 213 after the primary transfer.

Photoconductor drum 213 is, for example, a negative-charge-type organic photoconductor (OPC) formed by sequentially laminating an under coat layer (UCL), a charge generation layer (CGL), and a charge transport layer (CTL) on the circumferential surface of a conductive cylindrical body (aluminum-elementary tube) made of aluminum. The charge generation layer is made of an organic semiconductor in which a charge generating material (for example, phthalocyanine pigment) is dispersed in a resin binder (for example, polycarbonate), and generates a pair of positive charge and negative charge through light exposure by exposure device 211. The charge transport layer is made of a layer in which a hole transport material (electron-donating nitrogen compound) is dispersed in a resin binder (for example, polycarbonate resin), and transports the positive charge generated in the charge generation layer to the surface of the charge transport layer.

Charging device 214 is composed of a corona discharging generator such as a scorotron charging device and a corotron charging device, for example. Charging device 214 evenly negatively charges the surface of photoconductor drum 213 by corona discharge.

Exposing device 211 is composed of, for example, an light-emitting diode (LED) print head including an LED array having a plurality of linearly laid out LEDs, an LPH driving section (driver IC) for driving each LED, and an lens array that brings light radiated from the LED array into an image on photoconductor drum 213, and the like. Each of the LEDs of LED array 1 corresponds to one dot of an image.

Exposure device 211 irradiates photoconductor drum 213 with light corresponding to the image of each color component. The positive charge generated in the charge generation layer of photoconductor drum 213 irradiated with light is transported to the surface of the charge transport layer, whereby the surface charge (negative charge) of photoconductor drum 213 is neutralized. Thus, an electrostatic latent image of each color component is formed on the surface of photoconductor drum 213 by the potential difference from its surroundings.

Developing device 212 stores developers of respective color components (for example, a two-component developer composed of toner and magnetic carrier). Developing device 212 attaches toner of respective color components to the surfaces of photoconductor drums 213, and visualizes the electrostatic latent image to form a toner image. To be more specific, a developing bias voltage is applied to a developer bearing member 212a (for example, a developing roller), and an electric field is formed between photoconductor drum 213 and developer bearing member 212a. By the potential difference between photoconductor drum 213 and developer bearing member 212a, the charging toner on developer bearing member 212a is caused to move and attach to a light exposure section on the surface of photoconductor drum 213.

Drum cleaning device 215 includes a drum cleaning blade that is brought into sliding contact with the surface of photoconductor drum 213, and removes residual toner that remains on the surface of photoconductor drum 213 after the primary transfer.

Intermediate transfer section 22 includes intermediate transfer belt 221, primary transfer roller 222, a plurality of support rollers 223, secondary transfer roller 224, belt cleaning device 225 and the like.

Intermediate transfer belt 221 is composed of an endless belt, and is stretched around the plurality of support rollers 223 in a loop form. At least one of the plurality of support rollers 223 is composed of a driving roller, and the others are each composed of a driven roller. When driving roller rotates, intermediate transfer belt 221 travels in arrow A direction at a constant speed.

Primary transfer rollers 222 are disposed on the inner periphery side of intermediate transfer belt 221 in such a manner as to face photoconductor drums 213 of respective color components. Primary transfer rollers 222 are brought into pressure contact with photoconductor drums 213 with intermediate transfer belt 221 therebetween, whereby a primary transfer nip (hereinafter referred to as "primary transfer section") for transferring a toner image from photoconductor drums 213 to intermediate transfer belt 221 is formed.

Secondary transfer roller 224 is disposed on the outer periphery side of intermediate transfer belt 221 in such a manner as to face one of support rollers 223. Among support rollers 223, support roller 223 disposed to face intermediate transfer belt 221 is called "backup roller." Secondary transfer roller 224 is brought into pressure contact with the backup roller with intermediate transfer belt 221 therebetween, whereby a secondary transfer nip (hereinafter referred to as "secondary transfer section") for transferring a toner image from intermediate transfer belt 221 to a sheet is formed. A configuration (so-called belt-type secondary transfer unit) in which a secondary transfer belt is installed in a stretched state in a loop form around a plurality of support rollers including a secondary transfer roller may also be adopted in place of secondary transfer roller 224.

In the primary transfer section, the toner images on photoconductor drums 213 are sequentially primary-transferred to intermediate transfer belt 221. To be more specific, a primary transfer bias is applied to primary transfer rollers 222, and electric charge of the polarity opposite to the polarity of the toner is applied to the rear side (the side that makes contact with primary transfer rollers 222) of intermediate transfer belt 221, whereby the toner image is electrostatically transferred to intermediate transfer belt 221.

Thereafter, when the sheet passes through the secondary transfer section, the toner image on intermediate transfer belt 221 is secondary-transferred to the sheet. To be more specific, a secondary transfer bias is applied to secondary transfer roller 224, and an electric charge opposite to that of the toner is applied to the rear side (the side that makes contact with secondary transfer roller 224) of the sheet, whereby the toner image is electrostatically transferred to the sheet. The sheet on which the toner image has been transferred is conveyed toward fixing section 23.

Belt cleaning device 225 includes a belt cleaning blade configured to make sliding contact with the surface of intermediate transfer belt 221, and the like, and removes transfer residual toner remaining on the surface of intermediate transfer belt 221 after the secondary transfer. Belt cleaning device 225 is utilized in a toner refreshing operation for forcibly outputting degraded toner in developing device 212.

In addition, image density detection section 226 that detects the density of a toner image formed on intermediate transfer belt 221 is disposed in a region on the downstream side relative to the primary transfer section in the belt travelling direction and on the upstream side relative to the secondary transfer section in the belt travelling direction. Image density primary detection section 226 is, for example, a reflection-type photodetector that includes a light emitting device such as a light-emitting diode (LED) and a photodetector such as a photodiode (PD), and detects the reflection intensity of a toner image. Based on a result of detection obtained by image density detection section 226 when a patch image for correction is formed on intermediate transfer belt 221, correction data is created, and the image density is controlled.

Fixing section 23 includes upper fixing section 231 having a fixing side member disposed on a fixing surface (the surface on which a toner image is formed) side of a sheet, lower fixing section 232 having a back side supporting member disposed on the rear surface (the surface opposite to the fixing surface) side of a sheet, heating source 233 configured to heat the fixing side member, fixing temperature detection section 234 configured to detect a temperature (fixing temperature) of a region near the fixing side member, a pressure contact separation section (not illustrated) configured to bring the back side supporting member into pressure contact with the fixing side member, and the like.

For example, when upper fixing section 231 is of a roller heating type, the fixing roller serves as the fixing side member, and when upper fixing section 231 is of a belt heating type, the fixing belt serves as the fixing side member. In addition, for example, when lower fixing section 232 is of a roller pressing type, the pressure roller serves as the back side supporting member, and when lower fixing section 232 is of a belt pressing type, the pressing belt serves as the back side supporting member. FIG. 2 illustrates a configuration in which upper fixing section 231 is of a roller heating type, and lower fixing section 232 is of a roller pressing type.

Upper fixing section 231 includes upper fixing section-driving section for rotating the fixing side member. When control section 17 controls the operation of the upper fixing section-driving section, the fixing side member rotates (travels) at a predetermined speed. Lower fixing section 232 includes lower fixing section-driving section for rotating the back side supporting member. When control section 17 controls the operation of the lower fixing section-driving section, the back side supporting member rotates (travels) at a predetermined speed. It is to be noted that, in the case where the fixing side member follows the rotation of the back side supporting member, the upper fixing section-driving section is not required.

Heating source 233 is disposed inside or near the fixing side member. On the basis of a detection result of fixing temperature detection section 234 disposed at a position near the fixing side member, control section 17 controls the output of heating source 233 such that the fixing temperature is set to a fixation control temperature. When control section 17 controls the output of heating source 233, the fixing side member is heated, and maintained at the fixation control temperature (for example, a fixation target temperature, or an idling temperature).

A pressure contact separation section (not illustrated) presses the back side supporting member against the fixing side member. The pressure contact separation section makes contact with both ends of a shaft that supports the back side supporting member to separately press each end. With this structure, the balance of the nip pressure in the direction along the shaft in the fixing nip can be adjusted. When control section 17 controls the operation of the pressure contact separation section (not illustrated) such that the back side supporting member is brought into pressure contact with the fixing side member, a fixing nip for conveying a sheet in a tightly sandwiching manner is formed.

Heat and pressure are applied to a sheet on which a toner image has been secondary-transferred and which has been conveyed along a sheet feeding path at the time when the sheet passes through fixing section 23. Thus, the toner image is fixed to the sheet.

Sheet introduction section 14 includes sheet introduction roller section 141 and the like for example, and sends a roll sheet fed from sheet feeding apparatus 1A into main conveyance section 16. Sheet ejection section 15 includes sheet ejection roller section 151 and the like for example, and sends a roll sheet output from main conveyance section 16 into winding apparatus 1C.

Main conveyance section 16 includes a plurality of conveyance roller sections serving as sheet-conveyance elements for conveying sheets in a sandwiching manner. The conveyance roller sections include entry roller section 161 disposed on the upstream side of the secondary transfer section in the sheet conveyance direction. Main conveyance section 16 conveys a roll sheet introduced from sheet introduction section 14 through image forming section 20 (a secondary transfer section and fixing section 23), and conveys a sheet output from image forming section 20 (fixing section 23) toward sheet ejection section 15.

When an image is formed on a roll sheet, a roll sheet fed from sheet feeding apparatus 1A is introduced through sheet introduction section 14. The roll thus introduced is conveyed to image forming section 20 by sheet main conveyance section 16. Thereafter, a toner image on intermediate transfer belt 221 is secondary-transferred to a surface of the roll sheet at one time at the time when the roll sheet passes through the secondary transfer section, and then a fixing process is performed in fixing section 23. The roll sheet on which an image has been formed is ejected out of the apparatus from sheet ejection section 15, and wound by roll winding section 92 of winding apparatus 1C. As described, the sheet conveyance section of image forming apparatus main body 1B is configured by sheet introduction section 14, sheet ejection section 15, and main conveyance section 16.

In image forming apparatus 1, rotational runout of photoconductor drum 213 and rotational runout of developer bearing member 212a result in cyclic density unevenness in the sub scanning direction. Image forming apparatus 1 can efficiently correct the density variation in the sub scanning direction caused by the rotational runout of the rotational members.

Figure 5:
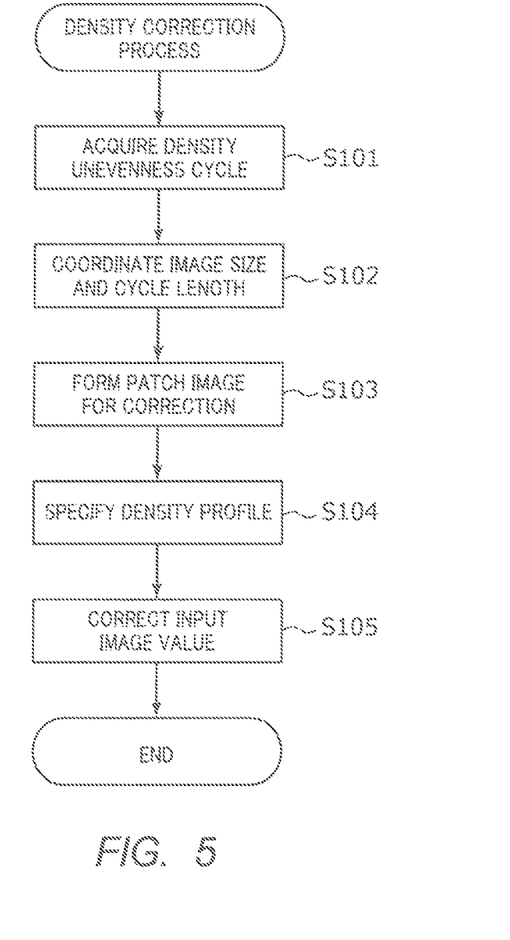
FIG. 5 is a flowchart of an exemplary image density correction process.

FIG. 5 is a flowchart of an exemplary density correction process. This process is achieved when CPU 171 executes a predetermined program stored in ROM 172 in response to reception of printing job at image forming apparatus 1, for example.

At step S101, control section 17 acquires a cycle of a density profile (hereinafter referred to as "density unevenness cycle") that represents the density variation in the sub scanning direction (density unevenness cycle acquiring section 17A). For example, control section 17 acquires, as the cycle of a density profile, one of the rotation cycle of photoconductor drum 213 and the rotation cycle of developer bearing member 212a registered in advance in storage section 182.

Whether the rotation cycle of photoconductor drum 213 or the rotation cycle of developer bearing member 212a is used as the density unevenness cycle is designated by the user in advance for example. The user can set the rotation cycle of photoconductor drum 213 as the density unevenness cycle to correct density unevenness due to rotational runout of photoconductor drum 213, or can set the rotation cycle of developer bearing member 212a as the density unevenness cycle to correct density unevenness due to the rotational runout of developer bearing member 212a.

At step S102, control section 17 controls the length of an image in the sub scanning direction (hereinafter referred to as "image size") such that the image size is an integer multiple of a cycle length corresponding to one cycle of the density unevenness cycle (cycle control section 17B).

To be more specific, by adjusting the length of the margin included in the image to control the size of the entire image, the image size can be set to an integer multiple of the cycle length of the density profile. In the case of an image in which multiple label images are provided in a spaced relationship in a predetermined pattern, the margins between the label images may be adjusted.

Figure 6A:
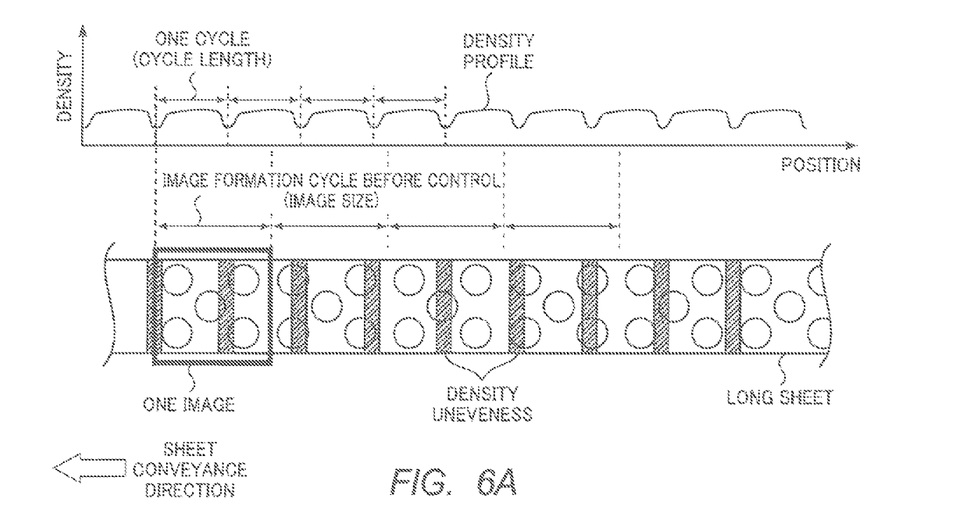
FIG. 6A and FIG. 6B illustrate exemplary relationships between a density profile and density unevenness on an image before and after a cycle control when an image is continuously formed on a long sheet.
Figure 6B:
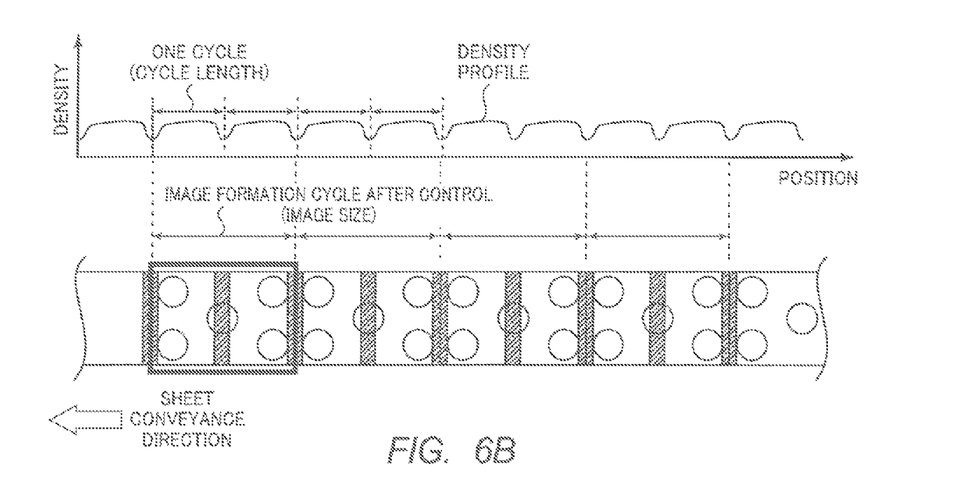

FIGS. 6A and 6B illustrate exemplary relationships between a density profile and density unevenness on an image before and after a cycle control when an image is continuously formed on a long sheet. FIG. 6A illustrates a relationship before a cycle control, and FIG. 6B illustrates a relationship after a cycle control. It is to be noted that the density profiles illustrated in FIGS. 6A and 6B merely show that the density profiles have a cycle, and do not represent the actual density variation. The actual density variation is acquired at steps S103 and S104 described later. The same applies to the density profiles illustrated in FIGS. 7A and 7B.

In FIGS. 6A and 6B, the cycle length of the density profile and the image size are coordinated by increasing the distances between the label images to lengthen the image size. It is to be noted that, when an initial image has a sufficient margin, it is possible to coordinate the cycle length of the density profile and the image size by reducing the margin to shorten the image size.

In addition, when the density profile includes density variation due to rotational runout of developer bearing member 212a, the image size can be set to an integer multiple of the cycle length of the density profile by controlling development θ that represents a ratio of a rotational speed of developer bearing member 212a to a rotational speed of photoconductor drum 213 to adjust the cycle length of the density profile. Development θ is adjusted by, for example, the rotational speed of developer bearing member 212a. The cycle length of the density profile increases as the rotational speed of developer bearing member 212a decreases, and the cycle length of the density profile decreases as the rotational speed increases. It is to be noted that development θ is set to a value that falls within a range of 1.0 to 3.5 for practical use.

Figure 7A:
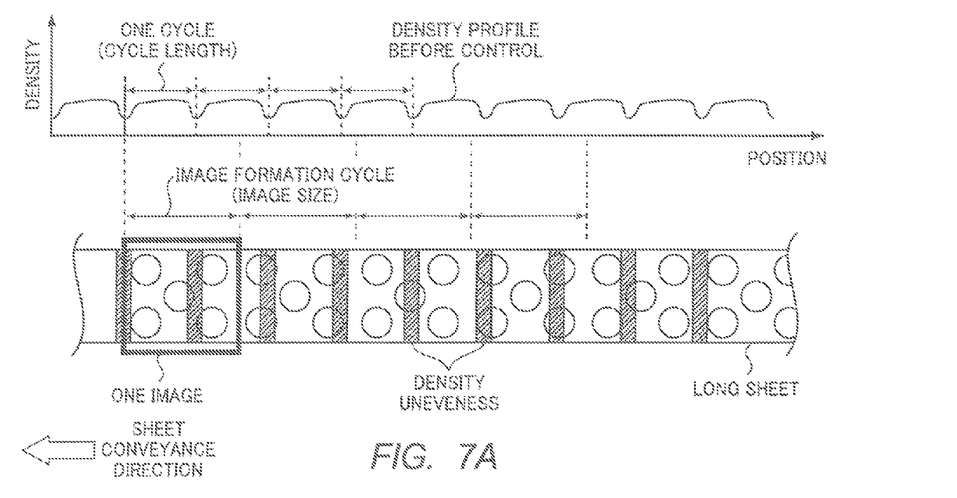
FIG. 7A and FIG. 7B illustrate exemplary relationships between a density profile and density unevenness on an image before and after a cycle control when an image is continuously formed on a long sheet.
Figure 7B:
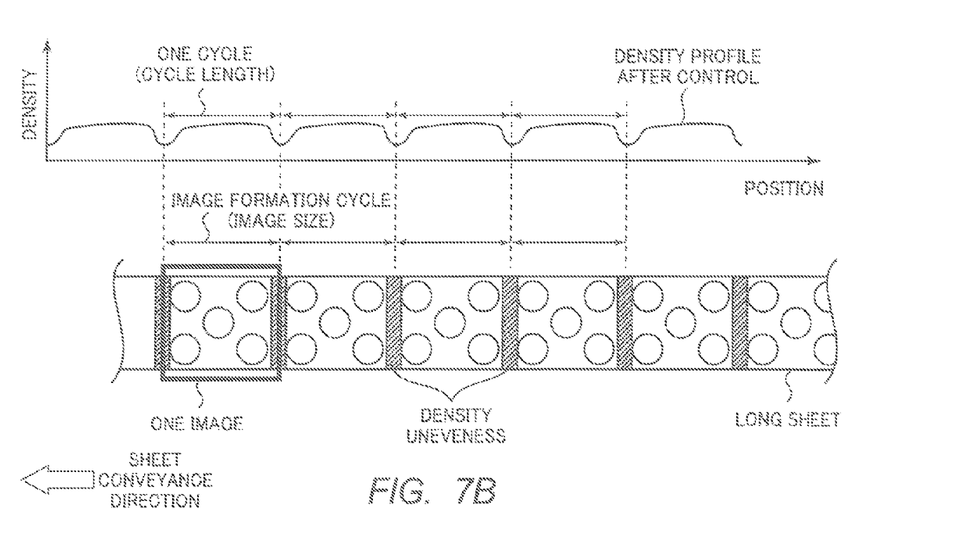

FIGS. 7A and 7B illustrate exemplary relationships between a density profile and density unevenness on an image before and after a cycle control when an image is continuously formed on a long sheet. FIG. 7A illustrates a relationship before a cycle control, and FIG. 7B illustrates a relationship after a cycle control.

In FIGS. 7A and 7B, by reducing the rotational speed of developer bearing member 212a to reduce development θ, the cycle length of the density profile is increased to a length greater than the initial cycle length, and thus the cycle length of the density profile and the image size are coordinated. It is also possible to reduce the cycle length of the density profile to a length smaller than the initial cycle length to coordinate the cycle length of the density profile and the image size.

Here, the following specifically describes a case where photoconductor drum 213 has a diameter of 60 mm (circumference: 188 mm), developer bearing member 212a has an outer diameter of 25 mm (circumference: 78.5 mm), a reference development θ is set to 1.8, and an image having an image size of 500 mm is formed.

When density unevenness is caused due to rotational runout of photoconductor drum 213, the cycle length of the density profile is 188 mm. Image size/cycle length is 2.66, and the image size is not an integer multiple of the cycle length. In this case, the image size is set to 564 mm such that image size/cycle length is 3. The image size may also be set to 376 mm such that image size/cycle length is 2 if possible in consideration of the margin in the initial image. Preferably, when the image size is changed, the image size is changed to a size close to the initial image size as much as possible.

When density unevenness is caused due to rotational runout of photoconductor drum 212a, the cycle length of the density profile is 78.5 (circumference of developer bearing member 212a)/1.8 (development θ), that is, 43.6 mm. Image size/cycle length is 11.46, and the image size is not an integer multiple of the cycle length. In this case, the image size is set to 523.2 mm such that image size/cycle length is 12. The image size may also be set to 479.6 mm such that image size/cycle length is 11 if possible in consideration of the margin in the initial image.

In addition, when density unevenness is caused due to rotational runout of photoconductor drum 212a, the cycle length may be set to 41.7 mm such that image size/cycle length is 12. That is, the rotational speed of developer bearing member 212a may be changed such that development θ is 78.5/41.7=1.88. Alternatively, the rotational speed of developer bearing member 212a may be changed to set the cycle length to 45.5 mm, that is, to set development θ to 1.72 such that image size/cycle length is 11. Preferably, when development θ is changed, development θ is changed to a value close to reference development θ (here, 1.80) as much as possible.

In this manner, when the image size is set such that the size is N (integer) times the cycle length of the density profile, one image is formed in N cycles of the density profile, and the same density profiles correspond to each image (see FIGS. 6 to 7). Thus, the same correction data can be utilized among all images.

At step S103 of FIG. 5, control section 17 forms on intermediate transfer belt 221 a patch image for correction (so-called solid image) having a highest density and a length greater than the cycle length of the density profile after the cycle control.

At step S104, control section 17 acquires a detection result obtained by image density detection section 226 regarding the patch image for correction (image density of the patch image for correction), and specifies the density variation in the density profile.

At step S105, based on the density profile obtained at step S104, control section 17 creates correction data such that the density unevenness is offset, and performs density correction using the created correction data (density correction section 17C). For example, with the correction data, the gradation value (input image value) of input image data is corrected. Image formation is performed based on the input image data after the correction. Since density variation in the sub scanning direction can be readily corrected by repeatedly utilizing the input image data after the correction, the processing load of control section 17 is remarkably reduced.

[Modification 1]

While the density unevenness cycle is set by the user in advance in the embodiment, control section 17 (density unevenness cycle acquiring section 17A) may select one of the rotation cycle of photoconductor drum 213 and the rotation cycle of developer bearing member 212a as a cycle of the density profile in accordance with use conditions such as the temperature and humidity, and the leaving time, coverage, endurance, continuous driving time of image forming apparatus 1 and the like. With this configuration, density correction can be effectively performed even when the factor (the rotational runout of photoconductor drum 213 or the rotational runout of developer bearing member 212a) for determining the density profile in the sub scanning direction varies depending on the use condition.

For example, as shown in Table 1, in the case of a high temperature and a high humidity, the case where the leaving time is long at a middle temperature and a middle humidity, and the case where the leaving time is long at a low temperature and a low humidity, the rotation cycle of photoconductor drum 213 is used as the density unevenness cycle. Meanwhile, in the case where the leaving time is short at a middle temperature and a middle humidity, and the case where the leaving time is short at a low temperature and a low humidity, the rotation cycle of developer bearing member 212a is used as the density unevenness cycle.

TABLE 1

| Temperature and humidity | Leaving time | Density unevenness cycle |
| --- | --- | --- |
| High temperature (≥25° C.) and high humidity (≥60% RH) | Long (≥12 hours) | Photoconductor drum |
| | Short (<12 hours) | Photoconductor drum |
| Middle temperature (≥15° C. and <25° C.) and middle humidity (≥30% RH and <60% RH) | Long | Photoconductor drum |
| | Short | Developer bearing member |
| Low temperature (<15° C.) and low humidity (<30% RH) | Long | Photoconductor drum |
| | Short | Developer bearing member |

[Modification 2]

In addition, control section 17 (density unevenness cycle acquiring section 17A) may form on image intermediate transfer belt 211 (image bearing member) a cycle determination patch longer than the rotation cycle of photoconductor drum 213 and the rotation cycle of developer bearing member 212a registered in advance to determine the cycle of the density profile based on a detection result of image density detection section 226 regarding the cycle of determination patch image. With this configuration, it is possible to appropriately acquire the cycle of a density profile in the case where the density is varied due to both the rotational runout of photoconductor drum 213 and the rotational runout of developer bearing member 212a.

As described, image forming apparatus 1 includes: a sheet conveyance section (sheet introduction section 14, sheet ejection section 15, main conveyance section 16) capable of conveying a roll sheet (long sheet); image forming section 20 including a rotational member and configured to form an image on the long sheet, the rotational member including photoconductor drum 213 (photoconductor) and developer bearing member 212a; density unevenness cycle acquiring section 17 (control section 17) configured to acquire a cycle of a density profile that represents density variation in a sub scanning direction; cycle control section 17B (control section 17) configured to operate such that, in a case where a same image is continuously formed on the long sheet, a length of the image in the sub scanning direction is an integer multiple of a cycle length that corresponds to one cycle of the density profile; image density detection section 226 configured to detect a density of an image formed by image forming section 20 on intermediate transfer belt 211 (image bearing member); and density correction section 17C (control section 17) configured to form a patch image for correction that has a size greater than the cycle length of the density profile on the image bearing member, and, based on a detection result regarding the patch image for correction that is obtained by image density detection section 226, create correction data to perform density correction using the correction data.

With image forming apparatus 1, in the case where the same image is continuously formed on a roll sheet, the length of the image in the sub scanning direction and the cycle length of the density profile are coordinated, and thus the same density profiles correspond to each image. In this manner, the density can be corrected using the same correction data at the time of image formation, and consequently a cyclic density variation in the sub scanning direction can be efficiently corrected. In addition, since the density of each image can be corrected in the same manner, constant quality of the images can be maintained.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, density correction may be performed by, instead of correcting the input image value, correcting image formation conditions such as the light exposure energy (light exposure time or light exposure output) of exposing device 211, the charging voltage of charging apparatus 214, the developing bias voltage of developing device 212, and the rotational speed of developer bearing member 212a based on the correction data during image formation.

In addition, it is also possible to dispose image density detection section 226 on the downstream side of fixing section 23 in the sheet conveyance direction such that the density of a patch image formed on a roll sheet is detected to specify the cycle of the density profile. With this configuration, it is possible to handle the case where density unevenness is cyclically caused in the sub scanning direction due to the rotational runout of intermediate transfer belt 221 and the rotational runout of the fixing side member.

Furthermore, correction data created based on the density profile may be adjusted in accordance the use condition. For example, every time when 500 sheets are printed, the data is reduced by 15% in the case of a high temperature and a high humidity, 5% in the case of a middle temperature and a middle humidity, and 10% in the case of a low temperature and a low humidity.

The embodiment disclosed herein is merely an exemplification and should not be considered as limitative. The scope of the present invention is specified by the following claims, not by the above-mentioned description. It should be understood that various modifications, combinations, subcombinations and alterations may occur depending on design requirements and other factors in so far as they are within the scope of the appended claims or the equivalents thereof.

What is claimed is:

1. An image forming apparatus comprising:
   a sheet conveyance section capable of conveying a long sheet;
   an image forming section including a rotational member and configured to form an image on the long sheet, the rotational member including a photoconductor and a developer bearing member;
   a density unevenness cycle acquiring section configured to acquire a cycle of a density profile that represents density variation in a sub scanning direction;
   a cycle control section configured to operate such that, in a case where a same image is continuously formed on the long sheet, a length of the image in the sub scanning direction is an integer multiple of a cycle length that corresponds to one cycle of the density profile;
   an image density detection section configured to detect a density of an image formed by the image forming section on an image bearing member; and
   a density correction section configured to form a patch image for correction that has a size greater than the cycle length of the density profile on the image bearing member, and, based on a detection result regarding the patch image for correction that is obtained by the image density detection section, create correction data to perform density correction using the correction data.

2. The image forming apparatus according to claim 1, wherein the density unevenness cycle acquiring section sets as the cycle of the density profile one of a rotation cycle of the photoconductor and a rotation cycle of the developer bearing member that are registered in advance.

3. The image forming apparatus according to claim 2, wherein the density unevenness cycle acquiring section selects one of the rotation cycle of the photoconductor and the rotation cycle of the developer bearing member as the cycle of the density profile in accordance with a use condition.

4. The image forming apparatus according to claim 1, wherein the density unevenness cycle acquiring section forms on the image bearing member a cycle determination patch image having a size longer than a rotation cycle of the photoconductor and a rotation cycle of the developer bearing member registered in advance, and determines the cycle of the density profile based on a detection result regarding the cycle determination patch image that is obtained by the image density detection section.

5. The image forming apparatus according to claim 1, wherein, in a case where the density profile includes density variation due to rotational runout of the developer bearing member, the cycle control section controls development θ that represents a ratio of a rotational speed of the developer bearing member to a rotational speed of the photoconductor.

6. The image forming apparatus according to claim 5, wherein the cycle control section operates such that variation of the development θ is minimized.

7. The image forming apparatus according to claim 1, wherein the cycle control section controls the length of the image in the sub scanning direction.

8. The image forming apparatus according to claim 7, wherein, when the image includes a plurality of label images disposed in a predetermined pattern, the cycle control section changes the pattern to control the length of the image in the sub scanning direction.

9. The image forming apparatus according to claim 7, wherein the cycle control section operates such that variation in the length of the image in the sub scanning direction is minimized.

10. The image forming apparatus according to claim 1, wherein the density correction section corrects an input value of the image using the correction data.

11. The image forming apparatus according to claim 1 further comprising:
    a sheet feeding section configured to feed a roll sheet to the sheet conveyance section; and
    a winding section configured to wind up the roll sheet output from the sheet conveyance section.

12. A density correction method in an image forming apparatus, the image forming apparatus including:
    a sheet conveyance section capable of conveying a long sheet, and
    an image forming section including a rotational member and configured to form an image on the long sheet, the rotational member including a photoconductor and a developer bearing member, the method comprising:
    acquiring a cycle of a density profile that represents density variation in a sub scanning direction;
    setting a length of the image in the sub scanning direction to an integer multiple of a cycle length that corresponds to one cycle of the density profile in a case where a same image is continuously formed on the long sheet; and forming a patch image for correction that has a size greater than the cycle length of the density profile on an image bearing member, and, based on a density of the patch image for correction, creating correction data to perform density correction using the correction data.

13. The method according to claim 12, wherein, in the acquiring, one of a rotation cycle of the photoconductor and a rotation cycle of the developer bearing member that are registered in advance is set as the cycle of the density profile.

14. The method according to claim 13, wherein, in the acquiring, one of the rotation cycle of the photoconductor and the rotation cycle of the developer bearing member is selected as the cycle of the density profile in accordance with a use condition.

15. The method according to claim 12, wherein, in the acquiring, a cycle determination patch image having a size longer than a rotation cycle of the photoconductor and a rotation cycle of the developer bearing member registered in advance is formed on the image bearing member, and the cycle of the density profile is determined based on a detection result regarding the cycle determination patch image.

16. The method according to claim 12, wherein, in a case where the density profile includes density variation due to rotational runout of the developer bearing member, development θ that represents a ratio of a rotational speed of the developer bearing member to a rotational speed of the photoconductor is controlled in the setting.

17. The method according to claim 16, wherein, in the setting, the development θ is controlled such that variation of the development θ is minimized.

18. The method according to claim 12, wherein, in the setting, the length of the image in the sub scanning direction is controlled.

19. The method according to claim 18, wherein, when the image includes a plurality of label images disposed in a predetermined pattern, the pattern is changed to control the length of the image in the sub scanning direction in the setting.

20. The method according to claim 18, wherein, in the setting, the length of the image in the sub scanning direction is controlled such that variation in the length of the image in the sub scanning direction is minimized.

* * * * *